Oct. 26, 1937.                 Z. RIDDLE                 2,097,044
                  COMBINATION SINK STOPPER AND TRAP
                        Filed March 24, 1937
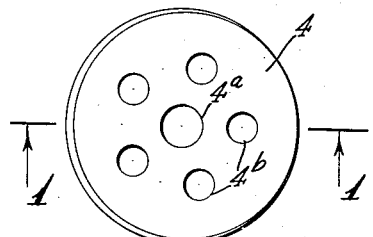
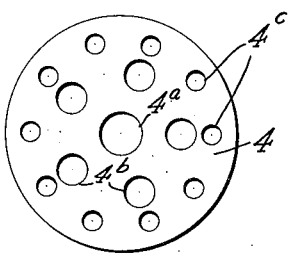
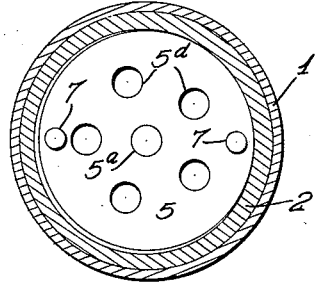
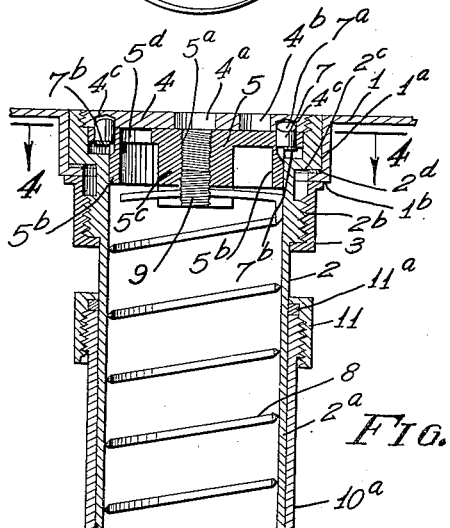
INVENTOR.
Zelie Riddle
BY A. B. Bowman
ATTORNEY.

Patented Oct. 26, 1937

2,097,044

UNITED STATES PATENT OFFICE 2,097,044

COMBINATION SINK STOPPER AND TRAP

Zelie Riddle, San Diego, Calif.

Application March 24, 1937, Serial No. 132,757

11 Claims. (Cl. 182—23)

My invention relates to a combination sink stopper and trap which serve as the outlet for water together with deleterious matter from the sink and the objects of my invention are:

First, to provide a sink stopper with stopper means in connection therewith for readily opening and closing the inlet to the trap from the sink;

Second, to provide a structure of this class with means in connection therewith for cleaning the trap with the opening and closing of the same;

Third, to provide a sink trap apparatus of this class which will keep the material passing from the sink through the trap stirred up and thus reduces to a minimum the liability of the trap becoming clogged;

Fourth, to provide an apparatus of this class which engages the wall of the trap and tends to remove any coating on the interior wall thereof with the opening and closing of the sink stopper;

Fifth, to provide an apparatus of this class which may be readily applied to the conventional sink opening and connecting fittings;

Sixth, to provide an apparatus of this class in which the trap pipe may be of conventional form;

Seventh, to provide an apparatus of this class in which the outlet to the sink and the inlet to the trap are alternately opened and closed by turning a wing member in one direction and provided with means for preventing the turning of the same in the opposite direction;

Eighth, to provide an apparatus of this class in which the trap is automatically cleaned and the walls scraped with the alternate opening and closing of the sink stopper;

Ninth, to provide a novelly constructed sink stopper; and

Tenth, to provide an apparatus of this class which is very simple and economical of construction and operation, easy to apply, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a longitudinal sectional view of my sink trap along the line 1—1 of Fig. 2 and showing a portion of the sink bottom and showing the outlet to the sink is closed; Fig. 2 is a top view of one of the sink stopper members; Fig. 3 is a bottom view thereof; Fig. 4 is a transverse sectional view from the line 4—4 of Fig. 1; Fig. 5 is a fragmentary sectional view of the sink stopper and corelating parts similar to Fig. 1, but showing the wing stopper open, and Fig. 6 is a transverse sectional view from the line 6—6 of Fig. 5.

Similar characters of reference refer to similar parts and portions throughout the several views of the drawing:

The sink bottom 1, insert sleeve 2, insert sleeve securing nut 3, sink stopper members 4 and 5, sink stopper control wing bolts 6, cam lugs 7, spring trap cleaner 8, spring trap cleaner supporting screw 9, trap member 10, trap member connecting nuts 11 and 12 and trap outlet connection 13 constitute the principal parts and portions of my combination sink stopper and trap.

The sink bottom 1, trap members 10, trap member connecting nuts 11 and 12, and trap outlet connection 13 and their cooperating gaskets and washers are of conventional type of trap construction.

Mounted in the conventional outlet opening 1a of the sink bottom 1 is an insert sleeve 2 which is provided with an extended tubular portion 2a which is adapted to fit in the interior of the enlarged portion 10a on the normally upper end of the conventional sink trap 10 and said trap is connected thereon by means of the trap connecting nut 11 and made tight by means of gasket 11a. This member 2 is provided with an extended thread portion 2b over which is mounted insert sleeve securing nut 3 and said nut extends upwardly and engages the lower extended portion 1b of the sink bottom opening portion. This sleeve 2 is provided with a shoulder 2c forming an enlargement of the sleeve at its normally upper end and between the shoulder and the upper portion of the sink bottom opening is interposed a gasket 2d, thus upon tightening the nut 3, the sleeve is rigidly secured in position. This sleeve 3 is internally threaded at its upper end and when fitted tight in position is flush with the main portion of the sink bottom as shown in Figs. 1 and 5 of the drawing.

Screw threaded in the threads in the upper end of the member 2 is a sink stopper member 4 which is provided with a central hole 4a which is adapted to receive the sink stopper control wing bolt 6. It is also provided with a series of openings 4b extending therethrough and at its lower side is provided with another series of smaller openings 4c which extend only partially through the nut member 4 and form engaging members for the cam member 7 of which there are two disposed on opposite sides and which are positioned in alignment with said holes and provided with bevelled top portions 7a to permit the turning of the member 4 in one direction. These members 7 are shiftably mounted in the sink stopper member 5 which is revolubly mounted in the upper portion of the sleeve below the stopper member 4 and engaged therewith. These members 7 are held upwardly in the holes 4c by springs 7b and thus these members 7 form a stop against the turn of the member 5 in the opposite direction. This member 5 is provided with a central screw threaded portion 5a which is adapted to receive the screw threaded end of the sink stopper control wing bolt 6. This member 5 is also provided with a flange 5b which extends downwardly some distance into the interior of the insert sleeve 2 and forms a guide and prevents the tilting of the member 5 when shifted away from the member 4 by turning to the open position shown in Fig. 5 of the drawing. This member 5 is also provided with a central downwardly extending lug portion 5c which is provided with a spring trap cleaner supporting screw 9 in its lower end and secured in this supporting screw 9 is the upper end of the spring trap cleaner 8 which is preferably curved as shown in Figs. 1 and 5 of the drawing and this spring trap cleaner is extended in spiral form as shown throughout the length of the trap, it being noted that if desired this cleaner may be extended into the extension 13 to any extent desirable by reducing the washer 12a at the one end of the trap member 10 shown in Fig. 1 of the drawing, this being obvious and not shown in the drawing.

The spring trap cleaner 8, it will be noted is preferably a triangularly shaped cross section as shown with one corner of the angle extending outwardly in engagement with the inner surface of the trap 10 and sleeve 2, thus providing a relatively sharp edge for engagement with the inner side of said trap and sleeve.

The operation of my combination sink stopper and trap is as follows: When the trap is closed as shown in Fig. 1 of the drawing by turning the sink stopper control wing bolt 6 in clockwise direction, the member 5 is revolved therewith, the cam surface engaging the sides of the openings 4c shifts the member 7 downwardly against the action of the spring 7b to the position as shown in Fig. 5 of the drawing bringing the openings 4b and 5d in conforming positions so that the fluid in the sink passes directly through the openings 4b and 5d and downwardly into the trap and when it is desired to close the stopper, the member 6 is turned in the same direction until the members 7 engage the latch holes 4c in line and the openings 4b and 5d are out of alignment as shown in Fig. 1 of the drawing and the trap is closed. With the movement of the member 5 and with the opening and closing, the spring trap cleaner 8 is revolved in the trap member 10 and sleeve 2, thus keeping the matter agitated and scraping the surface coating from the inner surface of the trap and sleeve.

Though I have shown and described a particular construction, combination, and arrangement of parts and portions, I do not wish to be limited to this particular construction, combination, and arrangement, but desire to include in the scope of my invention the construction, combination, and arrangement substantially as set forth in the appended claims.

Having thus described my invention, what I claim as new and desire to secure by Letters Patent is:

1. In a combination sink, stopper and trap, the combination with the conventional sink bottom outlet opening and trap, of a stopper revoluble in said outlet opening, and a spring trap cleaning member mounted in connection with said trap stopper and revoluble therewith and extending through said trap.

2. In a combination sink, stopper and trap, the combination with the conventional sink bottom outlet opening, of a stopper revoluble therein, a spring trap cleaning member mounted in connection with said trap stopper and revoluble therewith and extending into said trap, and means in connection with said sink stopper for preventing the turning of said stopper in one direction.

3. In a combination sink, stopper and trap, the combination with the conventional sink bottom outlet opening, of a stopper revoluble therein, a spring trap cleaning member mounted in connection with said trap stopper and revoluble therewith and extending into said trap, means in connection with said sink stopper for preventing the turning of said stopper in one direction, and means in connection with said stopper extending upwardly in the sink to facilitate the turning of the stopper.

4. In a combination sink stopper and trap, the combination with the conventional sink trap and sink bottom opening member, of a sleeve supported in the sink bottom opening member and extending into said trap member, a stationary sink stopper member mounted in the upper end of said sleeve provided with outlet openings therethrough and another sink stopper member mounted in said sleeve below said stationary stopper member revoluble therewith and provided with openings adapted to conform with the openings in said stationary member when in one position and in non-conforming position when turned to another position.

5. In a combination sink stopper and trap, the combination with the conventional sink trap and sink bottom opening member, of a sleeve supported in the sink bottom opening member and extending into said trap member, a stationary sink stopper member mounted in the upper end of said sleeve provided with outlet openings therethrough, another sink stopper member mounted in said sleeve below said stationary stopper member revoluble therewith and provided with openings adapted to conform with the openings in said stationary member when in one position and in non-conforming position when turned to another position, and a spring member adapted to fit the interior of said sleeve and the conventional sink trap and secured to said revoluble stopper member and revoluble therewith.

6. In a combination sink stopper and trap, the combination with the conventional sink trap and sink bottom opening member, of a sleeve supported in the sink bottom opening member and extending into said trap member, a stationary sink stopper member mounted in the upper end of said sleeve provided with outlet openings therethrough, another sink stopper member mounted in said sleeve below said stationary stopper member revoluble therewith and provided with openings adapted to conform with the openings in said stationary member when in one position and in non-conforming position when turned to another position, a spring member adapted to fit the interior of said sleeve and the conventional sink trap secured to said revoluble stopper member and revoluble therewith, cam means in connection with said revoluble member adapted to engage means in connection with said stationary member for preventing said revoluble stopper member from turning in backward direction.

7. In a combination sink stopper and trap, the combination with the conventional sink trap and sink bottom opening member, of a sleeve supported in the sink bottom opening member and extending into said trap member, a stationary sink stopper member mounted in the upper end of said sleeve provided with outlet openings therethrough, another sink stopper member mounted in said sleeve below said stationary stopper member revoluble therewith and provided with openings adapted to conform with the openings in said stationary member when in one position and in non-conforming position when turned to another position, a spring member adapted to fit the interior of said sleeve and the conventional sink trap secured to said revoluble stopper member and revoluble therewith, cam means in connection with said revoluble member adapted to engage means in connection with said stationary member for preventing said revoluble stopper member from turning in backward direction, said cam means shiftable in said revoluble stopper member.

8. In a combination sink stopper and trap, a stopper member secured in the bottom of the sink at the outlet opening, a revoluble stopper member positioned below said stationary stopper member, both of said stopper members having openings in annular alignment and adapted to conform in position and be offset in position when turned to different position.

9. In a combination sink stopper and trap, a stopper member secured in the bottom of the sink at the outlet opening, a revoluble stopper member positioned below said stationary stopper member, both of said stopper members having openings in annular alignment and adapted to conform in position and be offset in position when turned to different position, and means in connection with said stopper members for preventing the turning of said revoluble member backwardly.

10. In a combination sink stopper and trap, a stopper member secured in the bottom of the sink at the outlet opening, a revoluble stopper member positioned below said stationary stopper member, both of said stopper members having openings in annular alignment and adapted to conform in position and be offset in position when turned to different position, means in connection with said stopper members for preventing the turning of said revoluble member backwardly, and a spring trap cleaner secured to said revoluble member adapted to engage the interior of said trap and clean the wall with the turning of said revoluble stopper member.

11. In a combination sink stopper and trap, a stopper member secured in the bottom of the sink at the outlet opening, a revoluble stopper member positioned below said stationary stopper member, both of said stopper members having openings in annular alignment and adapted to conform in position and be offset in position when turned to different position, means in connection with said stopper members for preventing the turning of said revoluble member backwardly, a spring trap cleaner secured to said revoluble member adapted to engage the interior of said trap and clean the wall with the turning of said revoluble stopper member, said spring cleaner member being composed of spring wire, said wire being triangular in cross section with one pointed edge extending outwardly for engagement with the trap wall.

ZELIE RIDDLE.